(12) United States Patent
Lin

(10) Patent No.: US 6,408,951 B1
(45) Date of Patent: Jun. 25, 2002

(54) AUTOMATIC CABLE-CUTTING APPARATUS

(76) Inventor: Pi-Chu Lin, No. 79, Lane 716, Min-Sheng S. Rd., Chiayi City (TW)

( * ) Notice: Subject to any disclaimer, the term of this patent is extended or adjusted under 35 U.S.C. 154(b) by 0 days.

(21) Appl. No.: 09/854,584

(22) Filed: May 14, 2001

(30) Foreign Application Priority Data

Jan. 18, 2001 (TW) ......................................... 090201010

(51) Int. Cl.$^7$ ............................................. B25D 11/10
(52) U.S. Cl. ....................... 173/203; 173/124; 173/205; 30/167; 30/367
(58) Field of Search ................................ 173/203, 205, 173/120, 202, 121, 124, 132; 30/167, 367

(56) References Cited

U.S. PATENT DOCUMENTS

| | | | | |
|---|---|---|---|---|
| 4,682,412 A | * | 7/1987 | Pfeffer ........................... | 30/367 |
| 5,287,582 A | * | 2/1994 | Kawai et al. ................ | 173/205 |
| 5,427,188 A | * | 6/1995 | Fisher ........................... | 173/205 |
| 5,794,325 A | * | 8/1998 | Fallandy ....................... | 173/203 |
| 6,085,850 A | * | 7/2000 | Phillips ......................... | 30/167 |
| 6,212,758 B1 | * | 4/2001 | Baker et al. .................. | 173/203 |

* cited by examiner

*Primary Examiner*—Scott A. Smith
(74) *Attorney, Agent, or Firm*—Webb Ziesenheim Logsdon Orkin & Hanson, P.C.

(57) ABSTRACT

A cable-cutting apparatus includes a housing, a cutter rod with a fixed blade, an impact rod, a resilient unit for biasing the impact rod to press against the cutter rod, a rotating unit, and a driving unit. Normally, an engagement surface of the impact rod abuts against an engagement surface of the cutter rod. When the blade presses a cable against a planar surface, and when a switch of the driving unit is actuated to rotate the rotating unit, the engagement surface of the impact rod moves rearward away from the engagement surface of the cutter rod against the biasing action of the spring until the push rod reaches a rear limit position, after which the impact rod is biased by the spring to move forward to impact on the cutter rod, thereby cutting the cable with the blade.

4 Claims, 7 Drawing Sheets

AUTOMATIC CABLE-CUTTING APPARATUS

BACKGROUND OF THE INVENTION

1. Field of the Invention

This invention relates to an impact tool for cutting a cable, more particularly to an automatic cable-cutting apparatus, which can be activated by operating a switch.

2. Description of the Related Art

Referring to FIG. 1, a cable holder 1 is shown to include several cable holding rows 11, each of which is provided with two elongated planar surfaces 12 that are located on two sides thereof. Each of the rows 11 includes a plurality of cable clamping units 14, each of which can hold a cable 13 thereon. Accordingly, thousands of cables 13 (only one is shown) can be fastened to the holder 1. When the cables 13 have been mounted on the holder 1, surplus lengths of the former are cut off by means of a blade 28 so as to prevent hindrance to subsequent mounting and checking of the cables 13.

Referring to FIG. 2, the blade 28 is disposed on a cable-cutting apparatus 2, which includes a housing 21, a cutter rod 22, a driving unit 23, a guiding ring 24, an impact rod 25, a large spring 26, and a force-adjusting unit 27. The cutter 22 is disposed slidably in the housing 21. The blade 28 is fixed to an end of the cutter rod 22. The driving unit 23 is disposed between the cutter rod 22 and the impact rod 25, and includes a driving member 231 and a coiled small spring 232, which has an inclined lowermost turn 2324 that presses against an outwardly extending lower end flange 233 of the driving member 231. As such, the axis of the driving member 231 is inclined. The driving member 231 has a large-diameter lower portion 234, on which the small spring 232 is sleeved fixedly, a truncated conical middle portion 235, and a small-diameter upper portion 236. The impact rod 25 is biased by the large spring 26 to press the guiding ring 24 against an inwardly extending flange 210 of the housing 21. The force-adjusting unit 27 includes a follower piece 271 and a rotary knob 272, which is formed integrally with an outwardly extending flange 273 that is received rotatably within an annular groove 211 in the housing 21. When the rotary knob 272 is rotated, a cam surface 274 of the rotary knob 272 pushes the follower piece 271 to further compress the large spring 26, thereby increasing the biasing force of the large spring 26.

Referring to FIG. 3, when a force is applied to the blade 28 so as to press a cable 13 against one of the planar surfaces 12, a top surface of the cutter rod 22 pushes the driving member 231 to move upward through a central hole 241 in the guiding ring 24. When the driving member 231 moves upward to contact the impact rod 25, it turns to a somewhat inclined position, where the small-diameter upper portion 236 is still somewhat deflected from a blind hole 251 in the central portion of a bottom end surface of the impact rod 25, as illustrated. Upon further application of a depressing force to the apparatus 2, the small-diameter upper portion 236 turns to register with the hole 251 in the impact rod 25, thereby permitting a rapid downward movement of the impact rod 25 relative to the driving member 231. Hence, the impact rod 25 can impact on the driving member 231 so as to cut the cable 13 with the blade 28. Although the aforementioned apparatus 2 can cut effectively the cable 13, the force needed to be exerted by a person to press the apparatus 2 against the cable 13 is too large to cut numerous cables 13 efficiently.

SUMMARY OF THE INVENTION

An object of this invention is to provide an automatic cable-cutting apparatus, which can be activated by operating a switch.

According to this invention, a cable-cutting apparatus includes a housing, a cutter rod with a fixed blade, an impact rod, a resilient unit for biasing the impact rod to press against the cutter rod, a rotating unit, and a driving unit. Normally, an engagement surface of the impact rod abuts against an engagement surface of the cutter rod. When the blade presses a cable against a planar surface, and when a switch of the driving unit is actuated to rotate the rotating unit, the engagement surface of the impact rod moves rearward away from the engagement surface of the cutter rod against the biasing action of the spring until the push rod reaches a rear limit position, after which the impact rod is biased by the spring to move forward to impact on the cutter rod, thereby cutting the cable with the blade.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
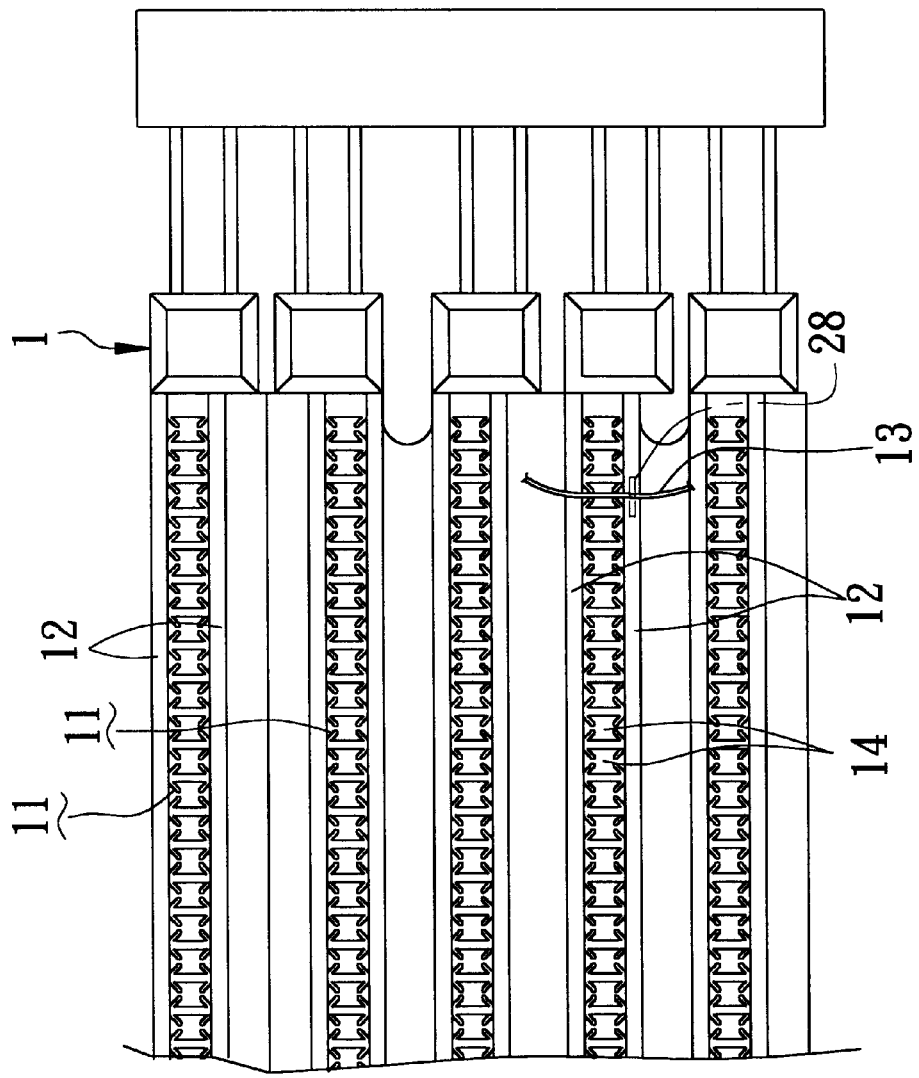
FIG. 1 is a schematic top view of a cable holder.
Figure 2:
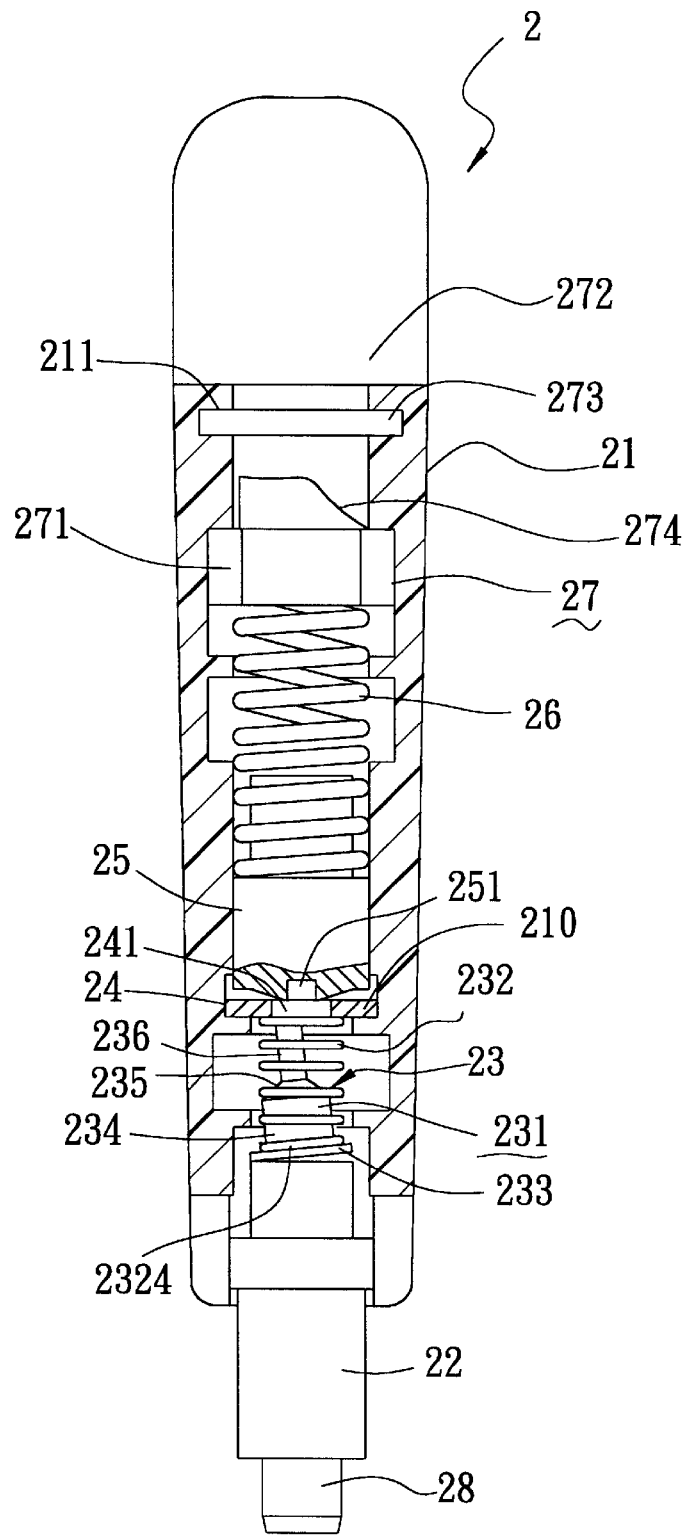
FIG. 2 is a sectional view of a conventional cable-cutting apparatus.
Figure 3:
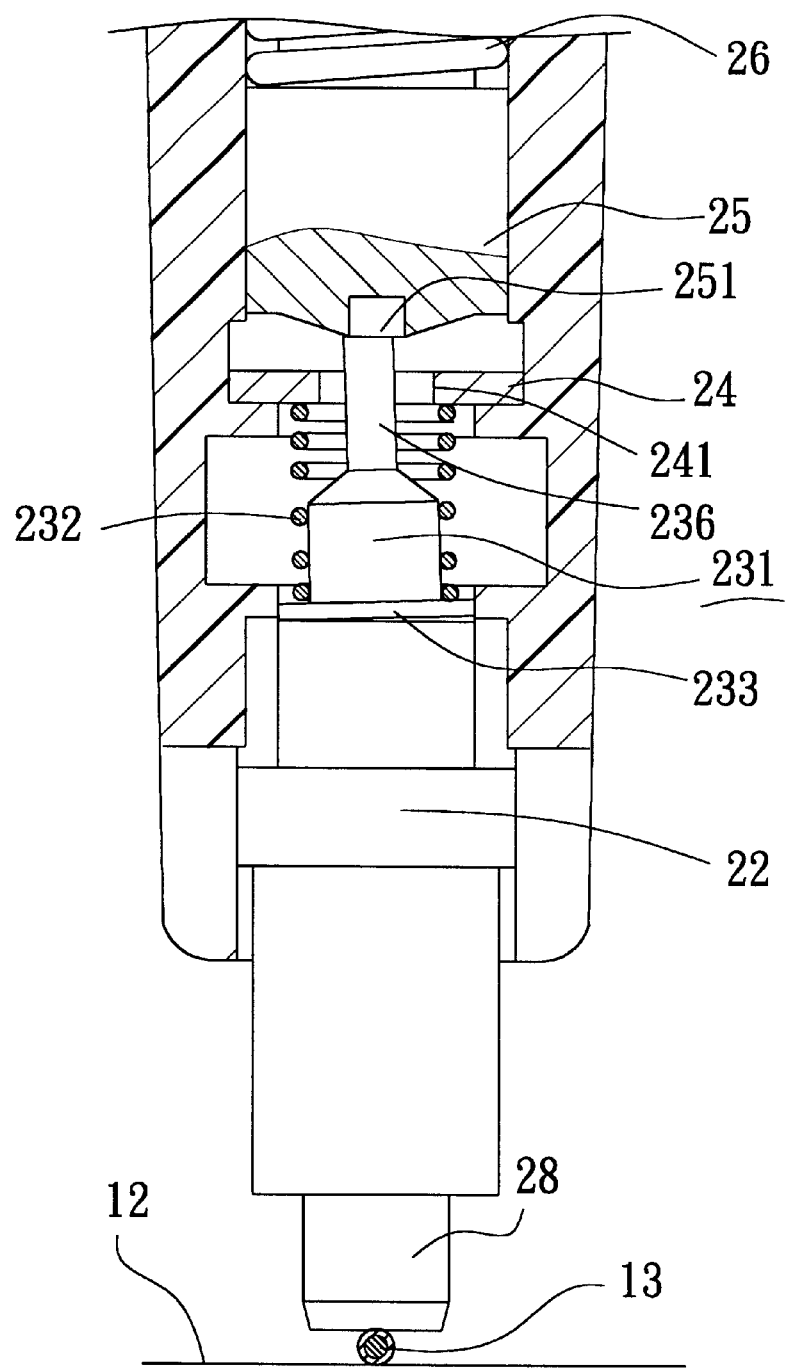
FIG. 3 is a fragmentary sectional view of the conventional cable-cutting apparatus, illustrating how a driving member is moved between a cutter rod and an impact rod.
Figure 4:
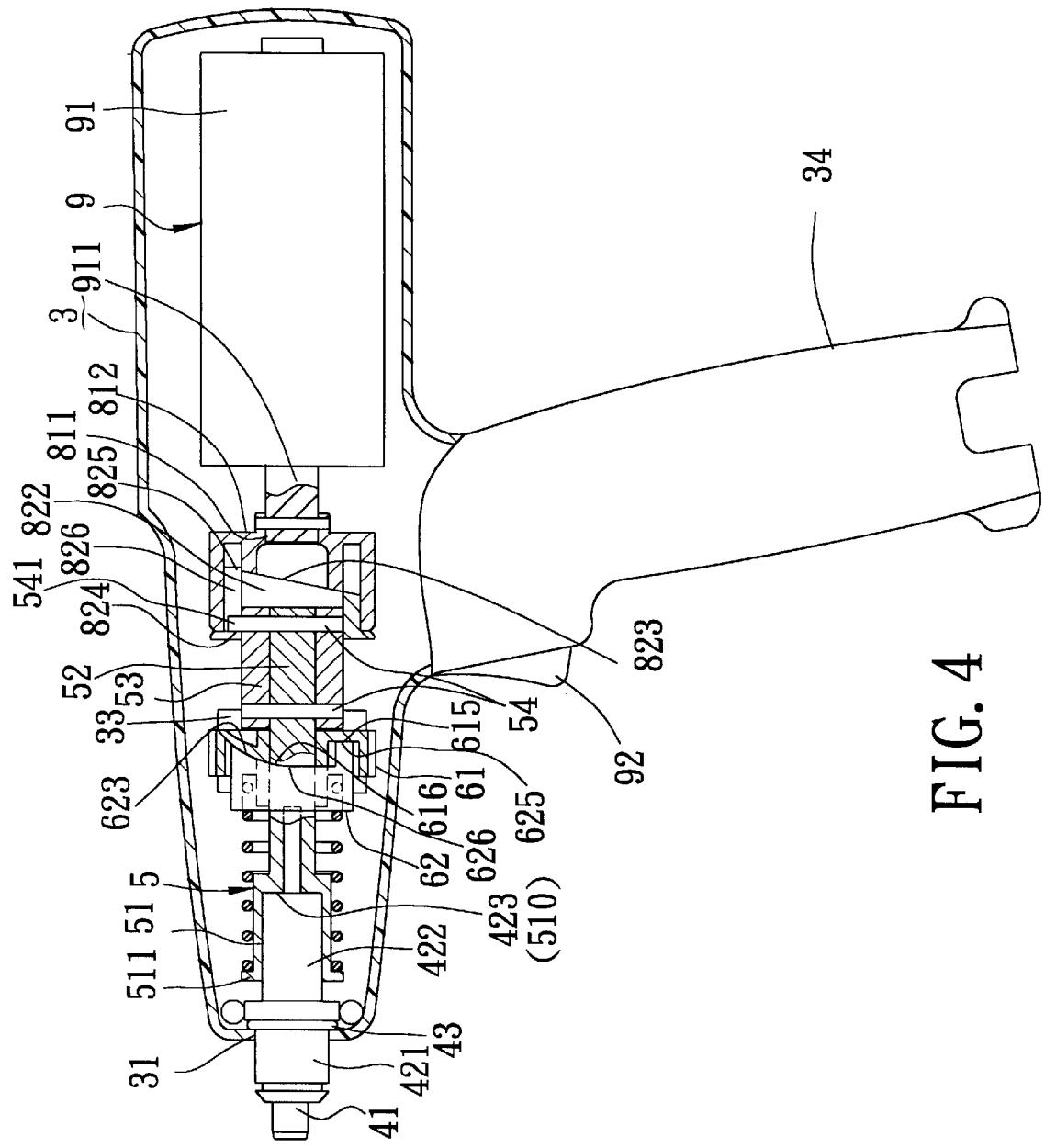
FIG. 4 is a partly sectional view of the preferred embodiment of a cable-cutting apparatus according to this invention.
Figure 5:
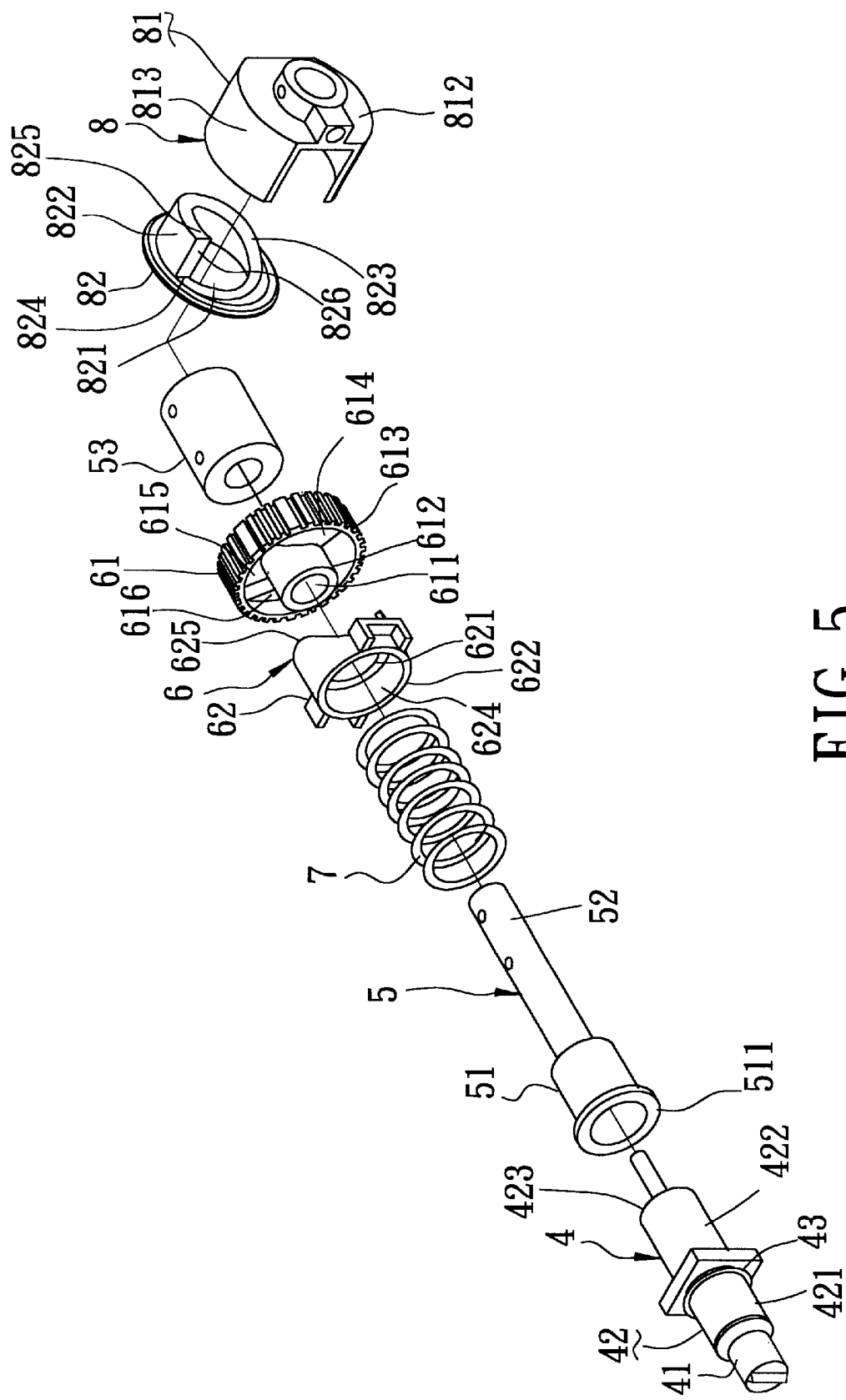
FIG. 5 is an exploded fragmentary perspective view of the preferred embodiment.

Referring to FIGS. 4 and 5, the preferred embodiment of a cable-cutting apparatus according to this invention is shown to include a housing 3, a cutter rod 4, an impact rod 5, a force-adjusting device 6, a resilient unit 7, a rotating unit 8, and a driving unit 9.

The housing 3 is shaped as a pistol, and has a front end that is formed with an opening 31.

The cutter rod 4 is disposed movably in the housing 3, and includes a fixed blade 41 disposed at a front end thereof, a rod body 42, and a cushion ring 43 sleeved intimately on the rod body 42. The rod body 42 has a front rod portion 421 that extends outwardly from the opening 31 in the housing 3, and a rear guiding portion 422 that is engaged fittingly and that is disposed slidably within a cylindrical front end sleeve 51 of the impact rod 5. The rear guiding portion 422 has a rear end engagement surface 423 that abuts against a front side engagement surface 510 of a rear end wall of the sleeve 51.

The end sleeve 51 has a front end, which is formed with an outward flange 511 that extends radially and outwardly therefrom.

The force-adjusting device 6 includes a rotary knob 61 that is disposed rotatably in the housing 3 and that is exposed from two windows 33 (only one is shown in FIG. 4) in the housing 3, and a follower ring 62 mounted movably on the rotary knob 61. The rotary knob 61 has a central hole 611 formed therethrough, and a front surface, which includes an annular inner flange 612, an annular outer flange 613, an annular groove 614 defined between the flanges 612, 613, and an annular cam face that is formed in the groove 614 and that has two flat portions 615 and two projections 616. The follower ring 62 has an inward flange 621 that extends radially and inwardly therefrom, a front end surface 622, a rear surface 623 (see FIG. 4), and a spring confining space 624 formed within the follower ring 62 in front of the inward flange 621. The rear surface 623 has two rearwardly projecting portions 625 that engage the flat portions 615 of the rotary knob 61, and two flat portions 626 that engage the projections 616 of the rotary knob 61.

The resilient unit 7 is shaped as a coiled compression spring, and has a front end that is sleeved fixedly on the sleeve 51 of the impact rod 5 and that abuts against the outward flange 511 of the sleeve 51, and a rear end that is sleeved on the inner flange 612 of the rotary knob 61 and that is disposed within the spring confining space 624 in the follower ring 62. As such, the engagement surface 510 of the impact rod 5 is biased by the spring 7 to abut against the engagement surface 423 of the cutter rod 4. Because the biasing force of the spring 7 is relatively large, the impact rod 5 and the follower ring 62 pressed by the spring 7 cannot rotate in the housing 3.

The rotating unit 8 includes an outer sleeve 81 disposed rotatably in the housing 3, and a guiding ring 82. The driving unit 9 includes a motor 91 disposed in the housing 3, and a pushbutton type switch 92 connected electrically to the motor 91. The motor 91 is provided with an output shaft 911 that extends into a circular hole 811 in the sleeve 81 and that that is connected fixedly to the sleeve 81. The sleeve 81 has a rear end wall 812 and a generally U-shaped surrounding wall 813 that extends integrally and forwardly from the end wall 812. A rod body 52 of the impact rod 5 extends through the spring 7, the follower ring 62, the rotary knob 61, a circular tube 53, and a central hole 821 in the guiding ring 82. A pair of front and rear lock pins 54 (see FIG. 4) lock the tube 53 on the impact rod 5.

The guiding ring 8 has a rear side surface, which is formed integrally with an annular guiding wall 822 that has a helical rear guiding surface 823 with a start point 824 and an end point 825, and an axial surface 826. The guiding wall 822 is received fittingly within the surrounding wall 813 of the outer sleeve 81, thereby permitting synchronous rotation of the outer sleeve 81 and the guiding ring 82 and movement of the guiding ring 82 within the outer sleeve 81. The axial surface 826 extends rearward from the start point 824 to the end point 825. The guiding wall 822 has an axial length that increases gradually from the start point 824 to the end point 825. The rear lock pin 54 serves as a guiding element, which has an end 541 that engages the start point 824 of the guiding surface 823.

Figure 6:
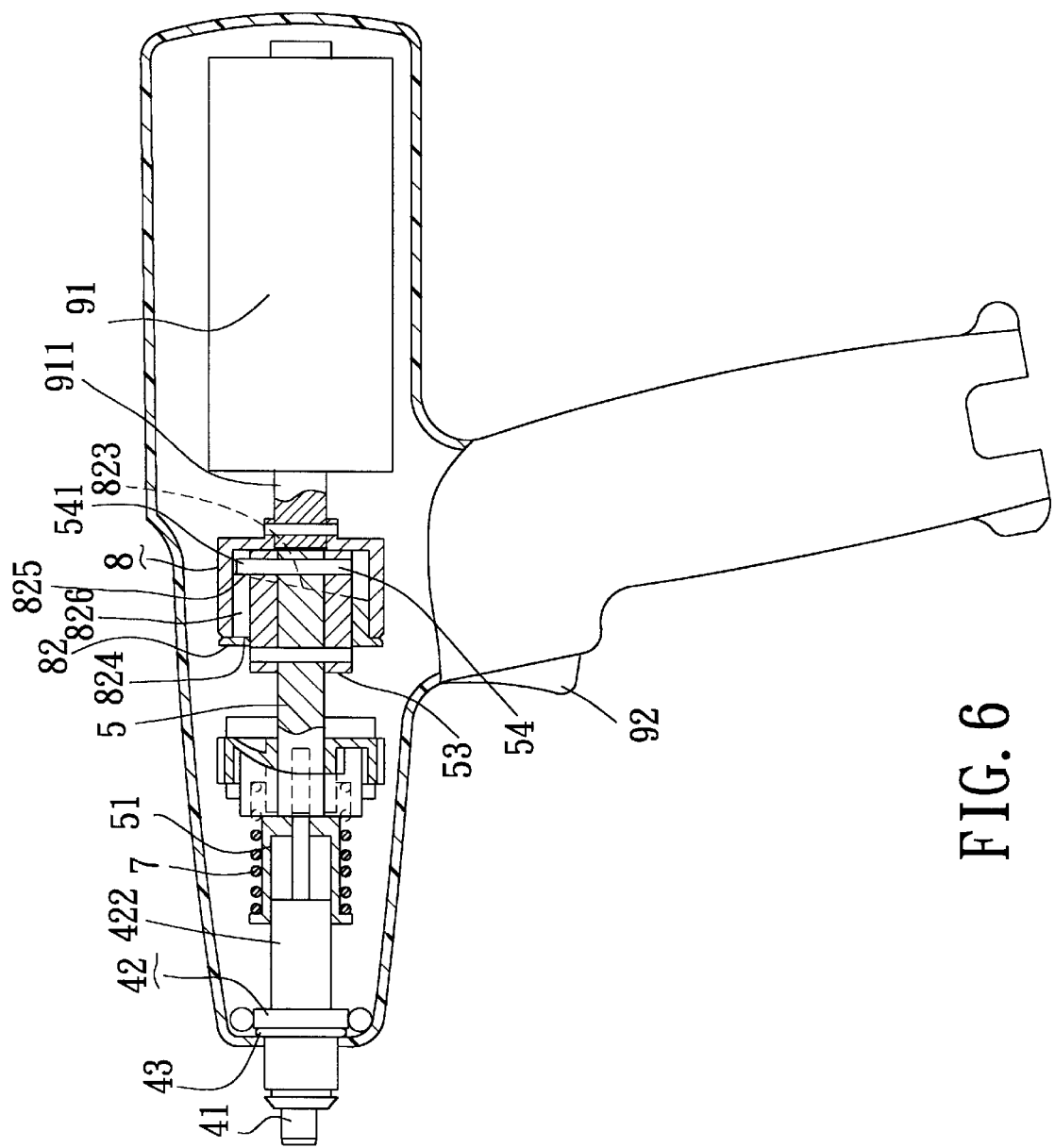
FIG. 6 is a partly sectional view of the preferred embodiment, illustrating the operation thereof.

As such, when the switch 92 is actuated to rotate the shaft 911 of the motor 91, the guiding ring 82 rotates in the housing 3. Hence, the end 541 of the rear lock pin 54 is urged rearward by the guiding surface 823 so as to move the engagement surface 510 of the impact rod away from the engagement surface 423 of the cutter rod 4 in a longitudinal direction of the cutter rod 4 until the impact rod 5 moves to a rear limit position shown in FIG. 6, where the end 541 of the rear lock pin 54 engages the end point 825 of the guiding surface 823, after which the end 541 of the rear lock pin 54 in turn moves forward back to the start point 824 along the axial surface 826. Accordingly, the impact rod 5 is pulled forward by the spring 7 so that the engagement surface 510 of the impact rod 5 impacts on the engagement surface 423 of the cutter rod 4, thereby permitting cutting of a cable (not shown) with the blade 41.

Figure 7:
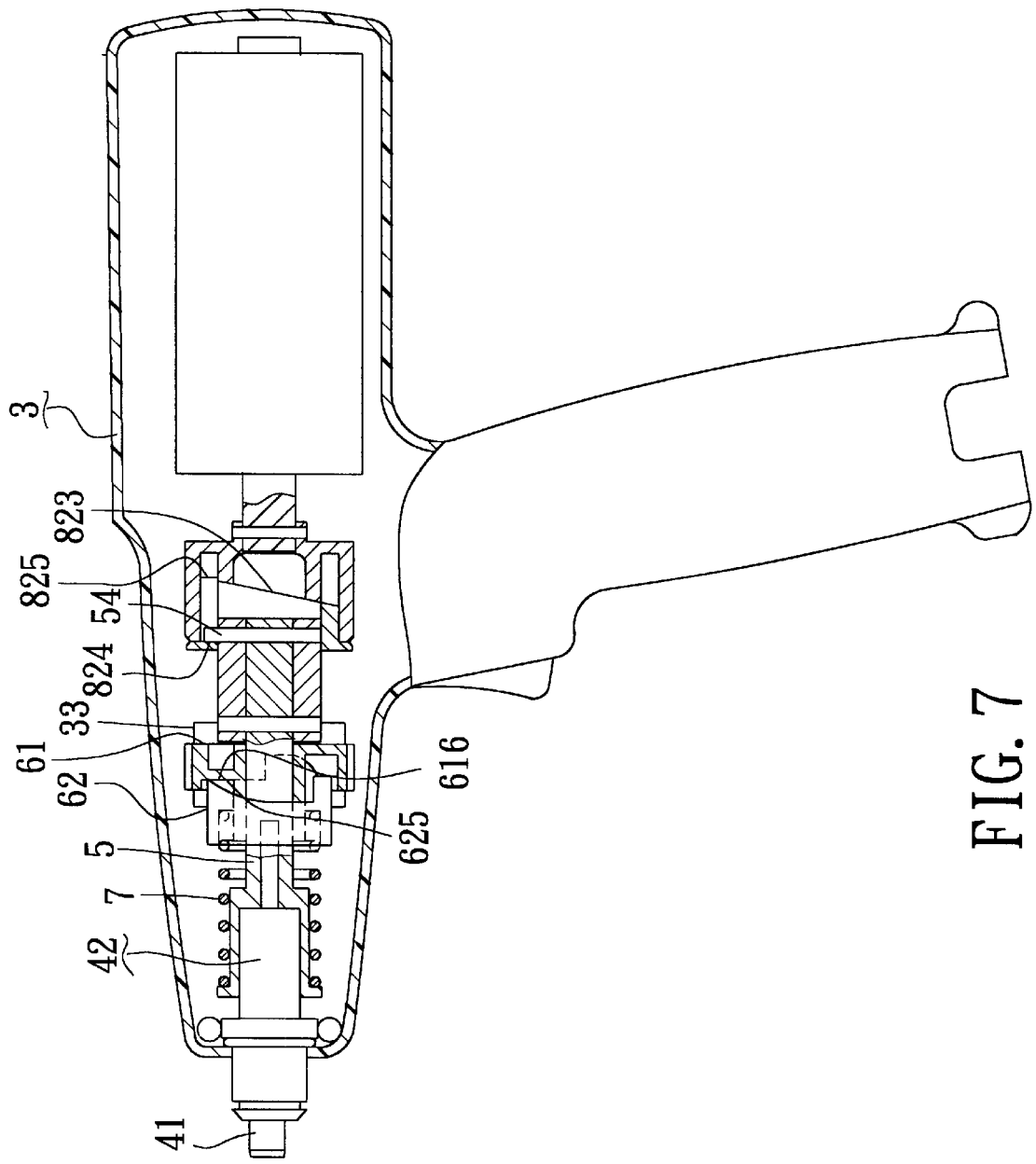
FIG. 7 is a partly sectional view of the preferred embodiment, illustrating how the impact force of an impact rod toward a cutter rod is adjusted.

Referring to FIG. 7, when it is desired to cut a thicker cable by means of the apparatus of this invention, the rotary knob 61 is rotated so that the cam face of the rotary knob 61 pushes the follower ring 62 forward, thereby further compressing the spring 7 so as to obtain an increased impact of the impact rod 5 on the cutter rod 4 when the switch 92 is actuated.

With this invention thus explained, it is apparent that numerous modifications and variations can be made without departing the scope and spirit of this invention. It is therefore intended that this invention be limited only as indicated by the appended claims.

I claim:

1. A cable-cutting apparatus for cutting a cable, the cable being placed on a planar surface, said apparatus comprising:

a housing having a front end that is formed with an opening;

a cutter rod disposed movably in said housing and having a front end portion with a fixed blade that extends outwardly from said opening in said housing and that is adapted to press the cable against the planar surface, and a rear end portion with an engagement surface, said cutter rod being movable relative to said housing in a longitudinal direction of said cutter rod;

an impact rod disposed movably and non-rotatably in said housing and having a front end portion with an engagement surface, said impact rod being movable relative to said housing in the longitudinal direction of said cutter rod;

a resilient unit for biasing said engagement surface of said impact rod forward to press against said engagement surface of said cutter rod;

a driving unit disposed in said housing and including a switch; and a rotating unit disposed rotatably in said housing and rotatable by said driving unit when said switch of said driving unit is actuated to move rearward said engagement surface of said impact rod away from said engagement surface of said cutter rod until said impact rod reaches a rear limit position, after which said impact rod is biased forward by said resilient unit so that said engagement surface of said impact rod impacts on said engagement surface of said cutter rod, thereby cutting the cable with said blade of said cutter rod.

2. The cable-cutting apparatus as claimed in claim 1, wherein said rotating unit includes:

an outer sleeve disposed rotatably in said housing and rotatable by said driving unit; and a guiding ring mounted movably and non-rotatably within said outer sleeve and formed integrally with an annular guiding wall, which has a helical rear guiding surface that includes a start point, and an end point, and an axial surface that extends rearward from said start point to said end point, said guiding wall having an axial length that increases gradually from said start point to said end point;

said impact rod being provided with a fixed guiding element that engages said start point of said guiding surface of said ring so as to move said impact rod rearward to said rear limit position when said guiding element moves from said start point to said end point of said guiding surface, after which said guiding element in turn moves forward from said end point to said start point along said axial surface, thereby permitting impact of said impact rod on said cutter rod.

3. The cable-cutting apparatus as claimed in claim 1, wherein said cutter rod includes an integral cylindrical rear guiding portion, which has a rear end surface that constitutes said engagement surface of said cutter rod, said impact rod having a front end, which is formed with a cylindrical end sleeve, within which said rear guiding portion of said cutter rod is engaged fittingly, said end sleeve having a rear end wall with a front side surface that constitutes said engagement surface of said impact rod.

4. The cable-cutting apparatus as claimed in claim 3, wherein said end sleeve has a front end, which is formed with an outward flange that extends radially and outwardly therefrom, said resilient unit being configured as a coiled compression spring, which is sleeved on said impact rod and which has a front end that abuts against said outward flange of said impact rod, said apparatus further including:

a rotary knob disposed rotatably in said housing and sleeved rotatably on said impact rod, said rotary knob having a front surface, which is formed with an annular groove and a cam face that is formed in said annular groove; and a follower ring disposed movably and non-rotatably within said annular groove in said rotary knob and having an inward flange that extends radially and inwardly therefrom, said compression spring having a rear end that presses against said inward flange of said follower ring, said follower ring further having a rearwardly projecting portion that engages said cam surface of said rotary knob, rotation of said rotary knob in said housing permitting movement of said projecting portion of said follower ring on said cam surface of said rotary knob so as to move said follower ring forward relative to said rotary knob, thereby further compressing said compression spring, whereby, the biasing force of said compression spring can be increased by rotating said rotary knob in said housing.

* * * * *